Figure 1:
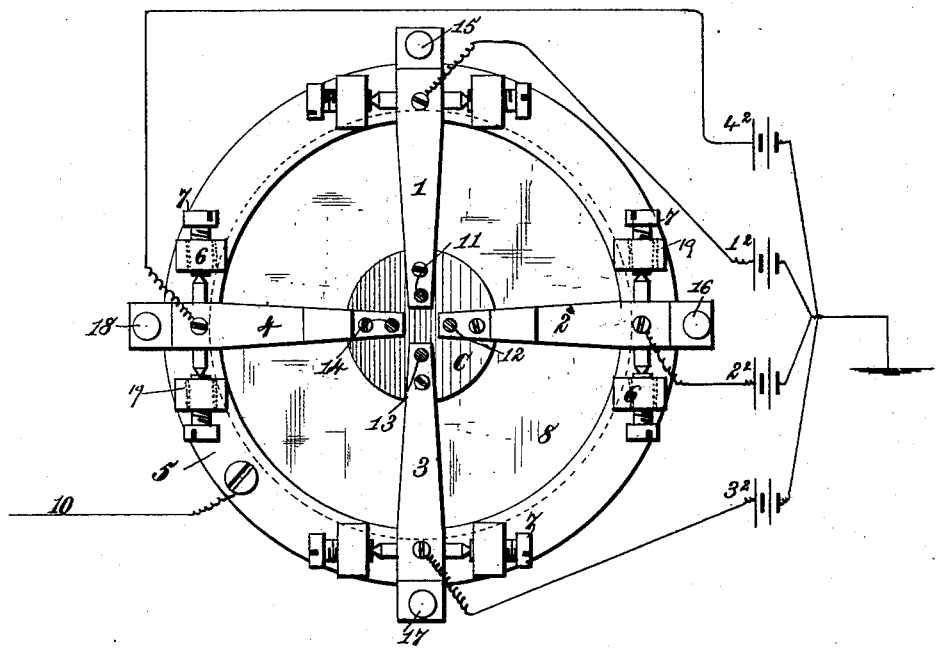

(No Model.)  2 Sheets—Sheet 1.

C. A. RANDALL.
TELEPHONE.

No. 336,744.   Patented Feb. 23, 1886.

Witnesses.
Robt Emrett
J. A. Rutherford

Inventor.
Charles A. Randall.
By James L. Norris.
Atty.

(No Model.) 2 Sheets—Sheet 2.

C. A. RANDALL.
TELEPHONE.

No. 336,744. Patented Feb. 23, 1886.

Witnesses.
Robert Everett.
J. A. Rutherford

Inventor:
Charles A. Randall.
By James L. Norris.
Atty.

UNITED STATES PATENT OFFICE.

CHARLES A. RANDALL, OF NEW YORK, N. Y.

TELEPHONE.

SPECIFICATION forming part of Letters Patent No. 336,744, dated February 23, 1886.

Application filed March 19, 1885. Serial No. 159,467. (No model.)

*To all whom it may concern:*

Be it known that I, CHARLES A. RANDALL, a citizen of the United States, residing at New York, in the county and State of New York, have invented new and useful Improvements in Telephonic Apparatus and Circuits, of which the following is a specification.

This invention relates to improvements in apparatus for transmiting sounds by means of electric currents from a battery through the medium of a diaphragm or other vibratory proper electrodes and line and local connections to battery and line.

In telephonic apparatus as now constructed it is usual to construct the transmitter with two electrodes, in combination with a vibrating diaphragm, the electrodes being in the same circuit with a local battery and the primary of an induction-coil. Transmitters have also been constructed in which two or more sets of electrodes are used in combination with a single vibrating diaphragm, the several independent sets or series of electrodes being insulated from each other and connected up in independent local circuit with their respective batteries and separate induction-coils, the secondaries of the induction-coils being connected up in series or in multiple arc to one main-line circuit. In all of these forms of transmitters a serious defect arises, in the form of an electric spark at the electrodes, affecting the articulation, destroying the electrodes, and throwing the apparatus out of adjustment, thus preventing the use of a battery or batteries of high electro-motive force, and the multiplication of independent sets or series of electrodes, in combination with their respective local batteries and induction-coils in independent local circuits as now practiced seems to add but very little to the current force upon the main line.

In telephonic apparatus as now used it is also customary and necessary to have a separate electric or magneto-electric generator independent of the battery used with the transmitting apparatus, and also call-bells, all of which add to the expense of the apparatus, and necessitate a greater number of parts that require attention and adjustment, and, besides, the use of the same is limited to telephone-circuits of moderate length, or largely increased in expense if adapted to long lines.

The objects of my invention are to avoid the objections stated, and to overcome the difficulties and defects now existing, and to provide means for utilizing a battery-current of high electro-motive force without detriment from the spark directly upon the main line or upon a circuit including the primary of a single induction-coil of proper dimensions in such manner that the main-line current will be one of great electric energy, capable of overcoming the resistance and leakage of a long line distance and operate proper receiving apparatus in a practical and reliable manner; also to provide means for obtaining a firm contact of the electrodes by gravity, in combination with a suitable adjustment for determining and maintaining the proper normal contact and position of the electrodes.

These objects of my invention I accomplish in the manner and by the means hereinafter described and claimed, reference being had to the accompanying description and drawings, in which—

Figure 2:
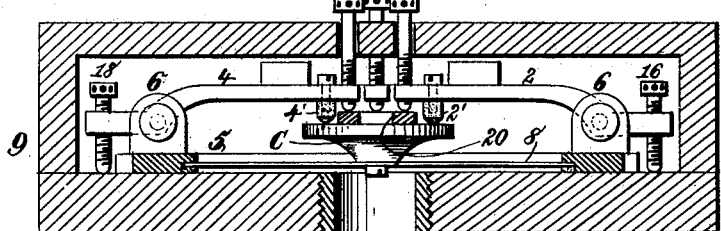
Figure 3:
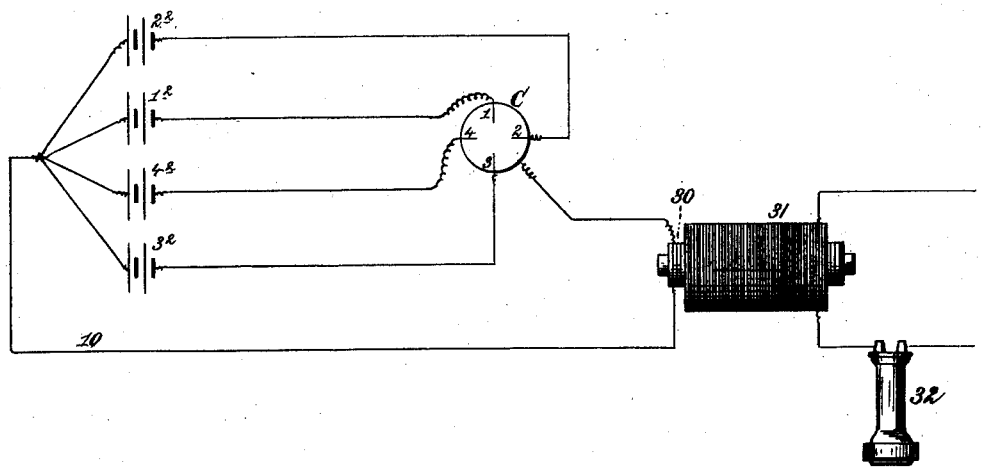

Figure 1 is a top plan view of the transmitting apparatus and circuits and batteries, the case being removed. Fig. 2 shows a part sectional view of the transmitter with arm 3 and the circuit-breaking and calling apparatus removed. Fig. 3 is a diagrammatic view showing an inductorium with its primary in the battery-circuit of the transmitter and its secondary in the induced current-circuit of a telephonic receiver.

In Figs. 1 and 2 numeral 5 represents a metal ring having lugs 6 cast thereon, which carry the screws 7, which in this case must be insulated from 6, the screws 7 serving as bearings for the rock-shafts, to which the arms 1 2 3 4 are secured. A seat is turned in the ring 5 for the diaphragm 8, which is held in place by suitable clamping-washers when the ring is properly secured to the case 9. A suitable horn-shaped mouth-piece is secured to the bottom of the case 9, the internal opening of which being opposite, or thereabout, to the center of the diaphragm 8.

To the diaphragm 8, I secure, preferably at its center, a proper electric conductor, C, which may be of metal or of carbon or other suitable conductor, that serves as an electrode, and from which the circuit must be made either by direct contact to the metal diaphragm or by special circuit-wire. As herein shown, it is in direct electrical contact with the diaphragm of metal 8 and the ring 5, from which extends the main-line wire 10, connected with a suitable telephonic receiver, or this wire 10 may represent the return battery-wire leading into the primary 30 of an inductorium, the secondary 31 of which contains the telephonic receiver 32.

The electrode C, I preferably make of small diameter at the point of contact with the diaphragm, that all vibrations of the same at its center may be imparted to the electrode C. The upper surface of the electrode I make of extended area, to enable me to arrange therewith and in contact therewith a large number of independent electrodes properly supported upon suitable electrode-carriers insulated from each other.

In the drawings I have shown four electrode-carriers, 1 2 3 4, mounted upon rock-shafts in proper bearings; but it will be understood that I am not limited to the precise construction or number shown, as a much larger number may be used. The arms 1 2 3 4 are provided with adjusting-screws 11 12 13 14, at their inner ends, and adjustable stop-screws 15 16 17 18, at their outer ends, and are provided with their respective electrodes, preferably of carbon, (two only, marked 2' and 4', being shown in Fig. 2,) which make firm electric contact with the electrode C, common to all of them, by gravity, the normal contact and position being obtained and maintained by means of the position-adjusting screws 11 12 13 14, the upward movement of the arms 1 2 3 4 and the electrodes, and consequent separation from the electrode C, being determined by the stop or limiting screws 15 16 17 18. The arms may be insulated from each other and the ring 5 in any suitable manner, as shown in the drawings by a dotted line. They are insulated by means of a rubber bushing, 19, in the lugs 6, the screws 7 being carried in the rubber. The arms are connected to their respective sections of the battery $1^2$ $2^2$ $3^2$ $4^2$, like poles being connected to their respective arms, the opposite pole being connected to a ground common to all. The adjusting-screws 11 12 13 14 in the arms 1 2 3 4 bear upon a cushion of soft rubber or other slightly-elastic support, 20, insulating the screws from the electrode C, while the upper ends or heads of the screws preferably pass up through and out of the top of the case for convenience of adjustment. Under this apparatus and circuit therefor the main-line battery is divided into sections, the electro-motive force of each being so low that a detrimental spark is not produced at the electrode of each respective section, while the several sections, having an electrode common to all as capable of conveying the total current as the whole line is, it in fact being a part of the line, the total current passed to the main line is of such electrical energy as to overcome the resistance of distance, the electro-motive force of the same, in fact, being limited only to the number of independent electrodes that may be conveniently used and operated simultaneously by the same vibrator and connected to different sections or divisions of the battery and in contact with an electrode common to all. By this plan the resistance of long lines is overcome, "leakage" provided for, and the disturbance and effects caused by "induction" largely reduced, if not entirely prevented, similarly as in telegraphy, in which system the working-current is always of greater force than the induced currents upon the same circuit, and the receiving apparatus is adjusted in such manner that but little if any trouble is caused from ordinary induction.

What I claim is—

1. In a telephonic apparatus, the combination of a main battery divided into sections, a series of independent battery-electrodes, one for each section of battery and connected thereto, and a diaphragm or vibrator carrying a single electrode common to all of the battery-electrodes and connected to the main-line wire, whereby the full effective working-current of the main battery as a whole may be passed to the main line through variable contact-electrodes without detrimental effects from the electric sparks at the electrodes, substantially as described.

2. In a telephonic apparatus, the combination of a main battery divided into sections, a series of independent battery-electrodes, one for each section of battery and connected thereto, and a diaphragm or other vibrator carrying a single electrode common to all of the battery-electrodes and connected to the return battery-wire through the primary of an inductorium, whereby the full effective working-current of the main battery as a whole may be passed through the primary of the inductorium through variable contact-electrodes without detrimental effects from the electric spark at the electrodes, substantially as described.

3. In a telephone-transmitter, the combination of the diaphragm ring or holder having ears or brackets formed integral therewith, and the independent levers fulcrumed in said ears and carrying adjusting-screws at both extremities, with the casing, and the diaphragm having an electrode made with part of its face non-conductive, substantially as herein set forth.

4. In a telephonic transmitter, the combination of a number of sections of battery, a series of electrodes, one for each section of battery and independently connected thereto, and an electrode capable of being affected by sound-vibrations, and having a continuous or unbroken conductive surface upon which the independent electrodes bear, whereby the current from the sections of battery is made to pass directly or without short-circuiting to the electrode common to all the independent electrodes, and from thence to the line or the return battery-wire, substantially as described.

5. In a telephonic transmitter, the combination of a number of sections of battery, a series of electrodes, one for each section of battery and independently connected thereto, and a diaphragm carrying an electrode having a continuous or unbroken conductive surface upon which the independent electrodes bear, whereby the current from the sections of battery is made to pass directly and without short-circuiting to the diaphragm-electrode, and from thence to the line or the return battery-wire, substantially as described.

In testimony whereof I affix my signature in presence of two witnesses.

CHAS. A. RANDALL.

Witnesses:
  JOSEPH B. BRAMAN,
  ELLIS E. WARING.